UNITED STATES PATENT OFFICE.

WALTER O. SNELLING, OF PITTSBURGH, PENNSYLVANIA, ASSIGNOR TO FRANK L. DYER, OF MONTCLAIR, NEW JERSEY, AND JONAS W. AYLSWORTH, OF EAST ORANGE, NEW JERSEY.

COMPOUND FOR EXTINGUISHING FIRES.

1,103,092.   Specification of Letters Patent.   Patented July 14, 1914.

No Drawing.   Application filed June 7, 1912.   Serial No. 702,195.

*To all whom it may concern:*

Be it known that I, WALTER O. SNELLING, a citizen of the United States, residing at 214 Main street, Pittsburgh, in the county of Allegheny and State of Pennsylvania, have invented certain new and useful Improvements in Compounds for Extinguishing Fires, of which the following is a specification.

This invention relates to improvements in compounds for extinguishing fires, particularly those of highly inflammable materials.

The object of my invention is to provide a material that will thoroughly extinguish fires, both those burning vigorously and smoldering, however refractory, by generating or producing over the burning material, a heavy vaporous blanket, or atmosphere, of dry combustion-arresting gas, which by reason of its greater specific gravity displaces air, and effectively excludes oxygen from the burning materials.

A further object of my invention is to produce the gas at the place of combustion, by the temperature due to the combustion, by applying to the fire a material having a boiling point above that of carbon-tetrachlorid; that has a high molecular weight; and that produces a heavy, sluggish vapor which clings to surfaces with which it comes in contact; that does not conduct electricity; and that is not corrosive *per se* to ordinary metal work, or destructive to delicate textiles, as are the dilute acids used in some fire extinguishing processes.

The material I use is a liquid, consisting preferably of carbon-tetrachlorid in which is dissolved or commingled halogen substitution products of hydrocarbons containing two or more carbon atoms in the molecule, such as acetylene, ethylene, ethane, propane and similar hydrocarbons which combine with halogens to form substitution products, or in the case of acetylene, addition products; or with ethylene, both substitution and addition products. The particular halogen compounds I prefer to use are the chlorin compounds, because of the comparative cheapness of this element over the other halogens. I have found the following compounds efficient as fire extinguishers when dissolved in carbon-tetrachlorid:—ethylene tri-chlorid, $C_2HCl_3$; ethylene tetra-chlorid, $C_2H_2Cl_4$; ethane tetra-chlorid, $C_2H_2Cl_4$; ethane penta-chlorid, $C_2HCl_5$; ethane hexa-chlorid, $C_2Cl_6$; propane tetra-chlorid, $C_3H_4Cl_4$; propane penta-chlorid, $C_3H_3Cl_5$; propane hexa-chlorid, $C_3H_2Cl_6$; propane hepta-chlorid, $C_3HCl_7$; propane octa-chlorid, $C_3Cl_8$.

These compounds, and other poly-halogen compounds of hydrocarbons having two or more carbon atoms in the molecule, dissolve in carbon tetra-chlorid, have comparatively high boiling points, and when applied to a fire, they volatilize, forming heavy vapors that are not readily dispersed by the heated gases arising from the burning materials, but cling to surfaces with which they happen to be in contact, shutting off the access of air to said surfaces, and thus retarding or extinguishing the flames. It is further to be noted that liquids having high boiling points absorb considerable heat in evaporating, and therefore the physical conversion of the compound from the liquid to the vapor state tends to materially lower the temperature of the heated surface that evaporates it.

The solution of carbon tetra-chlorid and poly-halogen compound is preferably applied to the fire from a siphon in which is carbon-dioxid under pressure; or in lieu of carbon dioxid, I may use nitrogen, or any other non-inflammable gas such as sulfur dioxid, chlorin, etc.; but I prefer carbon-dioxid or nitrogen. Or the solution may be kept in suitable glass bottles, hand grenades, etc., and such a container thrown at the burning objects, causing the breaking of the container and the spreading and volatilizing of the solution, the vapors enveloping the burning objects in an atmosphere that will not support combustion and excluding access of air thereto.

I have stated that I preferably use carbon tetra-chlorid as the solvent for the poly-halogen compounds. I do not, however, wish to limit myself to this solvent, for many other non-inflammable solvents are also efficient in this relation; for example, I may use a lower boiling poly-halogen hydrocarbon, such as chloroform, ethylene tri-chlorid, etc., as solvents for the higher boiling poly-halogen compounds; or solutions with which the poly-halogen compounds commingle instead of dissolve, may also be used, such as aqueous solutions of salts; or other solutions with which the poly-halogen hydrocarbons commingle or are miscible instead of being soluble therein, are also applicable for my purpose; and by the terms "solvent," etc., used in the claims, I mean to imply that the poly-halogen compound may be combined with a vehicle or carrier, either as a solution, mixture, or simply in suspension.

I claim:—

1. A fire extinguishing compound comprising a non-inflammable solvent, a carbon compound of the aliphatic series dissolved therein and having more carbon atoms in its molecule than the solvent.

2. A fire extinguishing compound comprising a non-inflammable solvent, a carbon compound of the aliphatic series dissolved therein, having more than one carbon atom in its molecule, and having a higher boiling point than the solvent.

3. A fire extinguishing compound, comprising a non-inflammable solvent, a carbon compound of the alipahatic series dissolved therein, having more carbon atoms in its molecule than the solvent, and having a higher boiling point than the solvent.

4. A fire extinguishing compound comprising a non-inflammable solvent, a non-inflammable carbon compound of the aliphatic series dissolved therein having more carbon atoms in its molecule than the solvent, said dissolved compound containing a halogen in its molecule.

5. A fire extinguishing compound comprising a non-inflammable solvent, a non-inflammable carbon compound of the aliphatic series dissolved therein having a higher boiling point than the solvent, and containing a halogen in its molecule.

6. A fire extinguishing compound comprising a non-inflammable solvent, a non-inflammable carbon compound of the aliphatic series dissolved therein having more carbon atoms in its molecule than the solvent and having a higher boiling point than the solvent, and also containing a halogen in its molecule.

7. A fire extinguishing compound comprising a non-inflammable solvent, a non-inflammable carbon compound of the aliphatic series dissolved therein having a higher boiling point than the solvent, and containing chlorin in its molecule.

8. A fire extinguishing compound comprising a non-inflammable solvent, a non-inflammable carbon compound of the aliphatic series dissolved therein having more carbon atoms in its molecule than the solvent, and also containing chlorin in its molecule.

9. A fire extinguishing compound comprising a non-inflammable solvent, a non-inflammable carbon compound of the aliphatic series dissolved therein having more carbon atoms in its molecule than the solvent and having a higher boiling point than the solvent, and also containing chlorin in its molecule.

10. A fire extinguishing compound comprising a non-inflammable solvent, a non-inflammable carbon compound of the aliphatic series dissolved therein having more than one carbon atom in its molecule, and also containing a halogen in its molecule.

11. A fire extinguishing compound comprising a non-inflammable solvent, a non-inflammable carbon compound of the aliphatic series dissolved therein having more than one carbon atom in its molecule, and also containing chlorin in its molecule.

12. A fire extinguishing compound comprising a non-inflammable solvent, a non-inflammable carbon compound of the aliphatic series dissolved therein having more than one carbon atom in its molecule, and having a higher boiling point than the solvent, and also containing a halogen in its molecule.

13. A fire extinguishing compound comprising a non-inflammable solvent, a non-inflammable carbon compound of the aliphatic series dissolved therein having more than one carbon atom in its molecule, and having a higher boiling point than the solvent, and also containing chlorin in its molecule.

14. A fire extinguishing compound comprising carbon tetrachlorid in which is dissolved a non-inflammable hydrocarbon compound of the aliphatic series having a molecular weight higher than chloroform and with more than one carbon atom in its molecule.

15. A fire extinguishing compound comprising carbon tetrachlorid in which is dissolved a non-inflammable carbon compound of the aliphatic series, and containing a halogen in its molecule, and with more than one carbon atom in its molecule.

16. A fire extinguishing compound comprising carbon tetrachlorid in which is dissolved a non-inflammable carbon compound of the aliphatic series and containing a halogen in its molecule, with more than one carbon atom in its molecule, and a boiling point higher than carbon tetrachlorid.

17. A fire extinguishing compound comprising carbon-tetrachlorid in which is dissolved a poly-chlorin carbon compound of the aliphatic series, and having a molecular weight higher than chloroform, and with more than one carbon atom in its molecule.

18. A fire extinguishing compound comprising carbon-tetrachlorid in which is dissolved a poly-chlorin carbon compound of the aliphatic series, and having a boiling point higher than carbon-tetrachlorid, and having more than one carbon atom in its molecule.

19. A fire extinguishing compound comprising carbon tetrachlorid in which is dissolved a poly-chlorin carbon compound of the aliphatic series, and having a molecular weight higher than chloroform, with more than one carbon atom in its molecule, and a boiling point higher than carbon-tetrachlorid.

20. A fire extinguishing compound comprising a non-inflammable vaporizable vehicle carrying a carbon-halogen compound of the alipathic series which has more than one carbon atom in its molecule.

21. A fire extinguishing compound comprising a non-inflammable vaporizable vehicle carrying a carbon-chlorin compound of the alipathic series which has more than one carbon atom in its molecule.

In testimony whereof I affix my signature in presence of two witnesses.

WALTER O. SNELLING.

Witnesses:
MILES H. ENGLAND,
JOHN E. CRAWSHAW.

---

Correction in Letters Patent No. 1,103,092.

It is hereby certified that in Letters Patent No. 1,103,092, granted July 14, 1914, upon the application of Walter O. Snelling, of Pittsburgh, Pennsylvania, for an improvement in "Compounds for Extinguishing Fires," an error appears in the printed specification requiring correction as follows: Page 2, line 99, for the word "hydrocarbon" read *carbon;* and that the said Letters Patent should be read with this correction therein that the same may conform to the record of the case in the Patent Office.

Signed and sealed this 4th day of May, A. D., 1915.

[SEAL.]

R. F. WHITEHEAD,

*Acting Commissioner of Patents.*